United States Patent Office 3,806,363
Patented Apr. 23, 1974

3,806,363
METHOD FOR SEPARATING FRUCTOSE
Yoshiyuki Takasaki, Chiba, Japan, assignor to Agency of Industrial Science and Technology, Tokyo, Japan
Continuation-in-part of abandoned application Ser. No. 205,782, Dec. 8, 1971. This application Jan. 12, 1973, Ser. No. 323,092
Claims priority, application Japan, Dec. 9, 1970, 45/109,162
Int. Cl. C13d 3/14; C13k 3/00, 9/00
U.S. Cl. 127—46 A     15 Claims

ABSTRACT OF THE DISCLOSURE

A mixture containing fructose, glucose and contaminating substances is poured into a bisulfite form and/or sulfite form anion-exchange resin bed which is maintained at a temperature between 40–60° C. Then, water is supplied to cause the sugars and contaminating substances to flow out from the bed. By this treatment, fructose is separated and recovered in a highly pure state.

REFERENCE TO COPENDING APPLICATION

This is a continuation-in-part of my copending application Ser. No. 205,782, filed Dec. 8, 1971, now abandoned.

BACKGROUND OF THE INVENTION

This invention relates to a method for the separation of fructose from a mixture containing it.

Fructose is the sweetest of all the sugars present in nature. Dietetically it is the most ideal sugar. As a sweetener and as an additive for use in medicines and drugs, fructose is attracting increasing attention.

Various methods have been brought to knowledge which are claimed to be useful for the individual separation of glucose and fructose from mixtures containing such sugars. Examples of these methods are: (1) Method for separating fructose from glucose by converting fructose into calcium-fructose complex by treatment with calcium hydroxide; (2) methods for effecting the desired separation by using a calcium form cation-exchange resin bed (U.S. Pat. No. 3,044,904, etc.); (3) method involving the use of a strontium form cation-exchange resin bed (U.S. Pat. No. 3,044,905); (4) method involving the use of an Ag form cation-exchange resin bed (U.S. Pat. No. 3,044,906); (5) method involving the use of a borate form anion-exchange resin bed (U.S. Pat. No. 2,818,851); (6) method involving the use of a hydrazine form cation-exchange resin bed (U.S. Pat. No. 3,471,329); (7) method involving the use of a bisulfite form anion-exchange resin bed (O. Samuelson, "Ion Exchangers in Analytical Chemistry," pp. 198 and 199 (1953)).

Of these numerous methods proposed to date, the method utilizing calcium hydroxide has alone been adopted for commercial operation. Nevertheless, this method is not totally economical and the yield obtained thereby is very poor. Fructose, consequently, has been an expensive commodity and has found limited uses such as in the manufacture of pharmaceutical products.

It is a principal object of this invention to provide an economical method for separating and recovering fructose at a high purity from a mixture consisting of fructose, glucose and contaminating substances.

This invention accomplishes the contemplated separation and recovery of fructose at a high purity by pouring a mixture consisting of fructose, glucose and contaminating substances into a bisulfite form or sulfite form anion-exchange resin bed which is maintained at a temperature between 40–60° C., and subsequently causing the mixture to flow out of the bed by using water.

Other objects and other characteristic features of this invention will become apparent from further description of the invention to be given hereinafter with reference to the accompanying drawings.

DETAILED DESCRIPTION OF INVENTION

Figure 1:
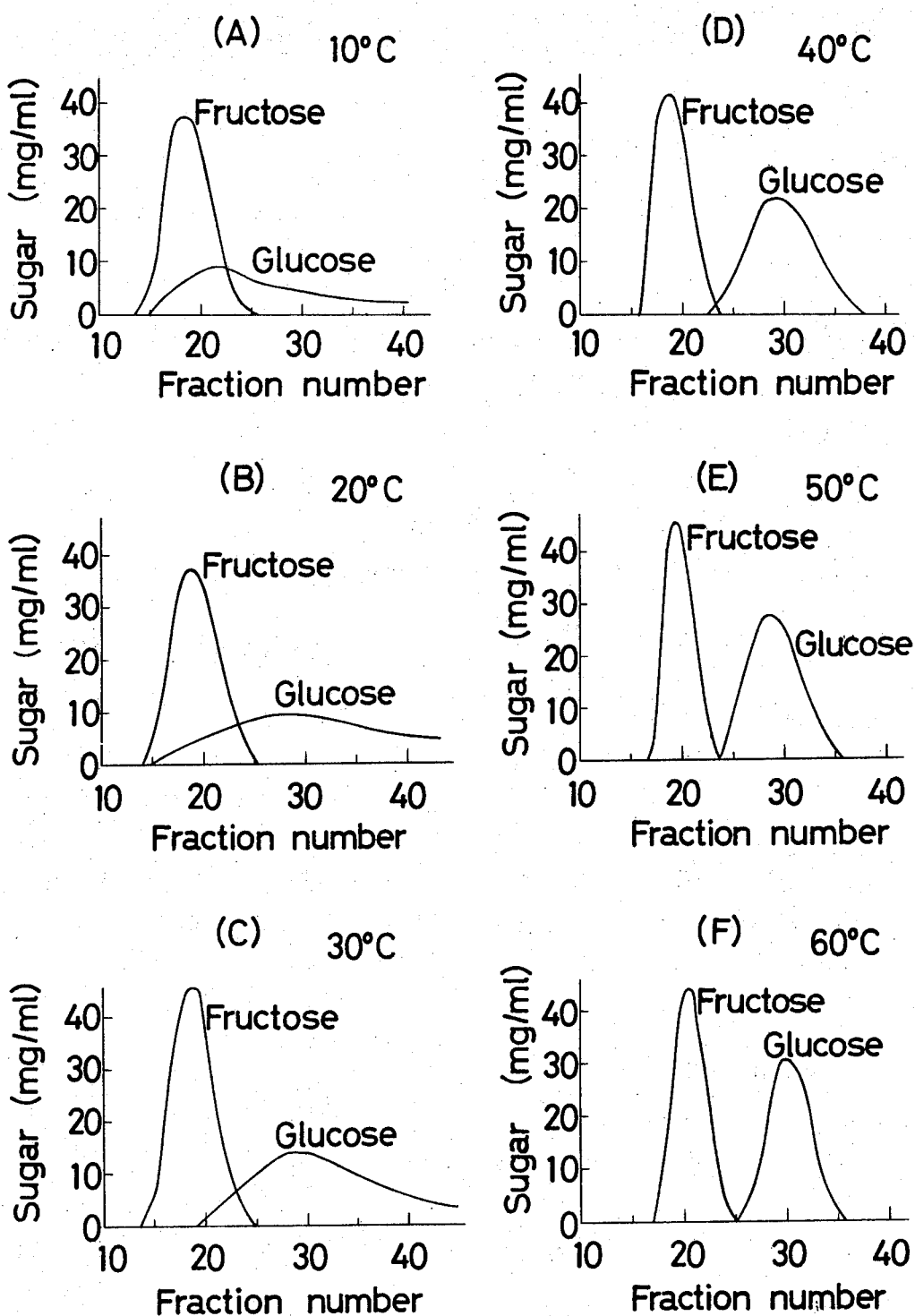
FIG. 1 is a graph illustrating the relationship between the temperature and the state of separation of the mixture of fructose and glucose which is separated into the respective sugars.

The inventor pursued a devoted study in search for a method capable of separating fructose on a commercial scale from a mixture containing glucose and fructose by a column chromatographic process. He has consequently made the discovery that fructose of high purity can be separated very effectively and economically from a sugar solution containing glucose and fructose or from an inexpensive raw material containing contaminating substances in addition to glucose and fructose by using a bisulfite form anion-exchange resin bed maintained in a fixed range of temperatures. He has also found that more effective separation of fructose can be accomplished by treating the mixture containing fructose, glucose and contaminating substances by means of a column packed with a sulfite form anion-exchanger in place of a bisulfite form anion-exchanger or a column packed with both bisulfite form and sulfite form anion-exchangers in combination. As previously described, methods for the separation of sugars by the use of a bisulfite form anion-exchange resin have been reported by Samuelson, and others [O. Samuelson, "Ion Exchangers in Analytical Chemistry," pp. 198–199 (1953), S. Adachi, Archives of Biochemistry and Biochemistry, vol. 100, pp. 468–471 (1963) and B. Lindberg, Carbohydrate Research, vol. 5, pp. 286–291 (1967)] but none of them have yet been reduced to commercial operation.

The separation of sugar by the use of a bisulfite form anion-exchange resin is based on the theory that the carbonyl group of sugar forms an addition compound upon union with the bisulfite group present in the bisulfite form anion-exchange resin. Fructose and glucose, however, are the kind of sugars which do not readily form such addition compounds in conjunction with the bisulfite group of the bisulfite form anion-exchange resin. For this reason, the quantity of these sugars capable of being treated for the said conversion by a unit volume of bisulfite type anion-exchange resin has been extremely small quantity of sugar (glucose plus fructose) has been less than 100 mg. per 100 ml. of the ion-exchange resin. Quantity production of fructose by this method, therefore, has required use of facilities of a scale extremely large for the size of yield. Further, since the fructose and glucose which are eluted from the bisulfite form anion-exchange resin bed are both in a very low concentration, the expense incurred for their concentration by evaporation has been great in the case of a commercial operation. Particularly, the eluted glucose is in such a low concentration (less than 0.2% in the maximum effluent concentration) that recovery of glucose from the eluate has been substantially impracticable in view of the discouragingly low market price of glucose. Thus, it has heretofore been impossible to effect the separation of fructose inexpensively on a commercial scale by this method.

According to this invention, however, the quantity of sugar which can be treated per unit volume of anion-exchange resin can be increased amazingly. To be specific, the quantity of sugar (glucose plus fructose) which can be treated per 100 ml. of the ion-exchange resin is on the order of 5–20 g. Since fructose and glucose are eluted both in a high concentration, the expense incurred for the concentration can be amply lowered. This means that the method of this invention is highly advantageous for the purpose of commercial operation.

Moreover, fructose of high purity can be produced by the present invention even when the separation is made from a raw material of the kind that contains, in addition to glucose and fructose, other sugars such as mannose formed by the alkali isomerization of glucose and psicose formed by the alkali isomerization of fructose, oligosaccharides (including disaccharides and trisaccharides), inorganic salts such as sodium chloride, organic salts, borates and color materials.

Further, according to this invention, not only fructose but also glucose can be recovered completely. In addition, glucose itself can be converted to fructose quite advantageously from the commercial point of view: This is accomplished by isomerizing glucose into fructose by using a suitable catalyst such as a glucose isomerase (enzyme which is capable of isomerizing glucose into fructose), an alkali or an anion-exchange resin as described in further detail hereinafter. By this method or some other known method, the separation of fructose can be effected advantageosuly on a commercial scale.

An anion-exchange resin having a sulfite group or bisulfite group to be used for the present invention may be prepared from any of various kinds of anion-exchange resins. For example, Dowex 1–X4 and Dowex 1–X8 (made by the Dow Chemical Company) and Amberlite IRA–400 (made by Rohm and Haas Company) can be used preferably.

The bisulfite form anion-exchange resin is prepared by treating a selected anion-exchange resin with sodium hydroxide thereby converting the resin into the OH form, allowing sodium bisulfite ($NaHSO_3$) or potassium bisulfite ($KHSO_3$) to react upon the resultant OH form anion-exchange resin for necessary substitution of radicals, and finally washing the substitution product with water. The bisulfite form anion-exchange resin thus produced is put to use. The sulfite form anion-exchange resin is prepared by following the procedure mentioned above, except that sodium sulfite ($Na_2SO_3$) or potassium sulfite ($K_2SO_3$) is used in place of the said bisulfite. When sodium or potassium bisulfite of an impure grade is used for the said substitution of the anion-exchange resin, there is simultaneously produced a small proportion of sulfite form anion-exchange resin besides the bisulfite form anion-exchange resin.

The separation of fructose and glucose by means of the bisulfite (and/or sulfite) form anion-exchange resin can be accomplished more advantageously by using two or more anion-exchange resin beds arranged in series connection. The efficiency of separation can be increased when the two or more anion-exchange beds are arranged in series connection in the decreasing order of bed width relative to the direction of the flow of treatment.

FIG. 1 is a graph showing the relationship between the quantities of glucose and fructose separated and the temperatures of treatment as determined where a mixture of glucose and fructose was treated with a bisulfite group-containing anion-exchanger, with the temperatures varied as indicated.

For this treatment were used double-walled columns having an inner column measuring 1.9 cm. in inside diameter and 30 cm. in length. The inner columns were packed each with the bisulfite form Dowex 1–X4 resin having a particle size of 100 to 200 mesh. The anion-exchangers thus placed in these columns were maintained at about 10° C. (curve (A) in FIG. 1), about 20° C. (curve (B) in FIG. 1), about 30° C. (curve (C) in FIG. 1), about 40° C. (curve (D) in FIG. 1), about 50° C. (curve (E) in FIG. 1), and about 60° C. (curve (F) in FIG. 1) respectively by circulating cold water or hot water inside the outer columns to suit each occasion. To each of the columns was fed 2 ml. of sugar solution containing 628 mg. of glucose and 568 mg. of fructose. The sugar supplied to the resin bed was subsequently washed out of the columns by running water through the columns. The flow rate of water was about 20 ml./hr. and the fraction volume was 3 ml.

It is clear from the graph that glucose and fructose flowed through the anion-exchangers in a substantially unseparated state where the anion-exchangers were maintained at 10° C. and 20° C. respectively. Separation between the two sugars is noted to have occurred slightly where the anion-exchanger was maintained at 30° C. (curve (C) in FIG. 1). The curves (A), (B) and (C) clearly indicate that glucose flowed out of the column at a low concentration over a prolonged period and, as a consequence, thorough removal of glucose from the column interior entailed consumption of huge volumes of water. It greatly hinders an attempt to achieve inexpensive, quantity production of fructose on a commercial scale. The situation changed radically where the temperature at which the anion-exchanger was maintained was higher than 40° C. As is evident from the curves (D), (E) and (F) of FIG. 1, separation of fructose and glucose proceeded quite smoothly and glucose flowed out of the column at a high concentration where the column temperature exceeded 40° C. This means that the effluence of not only fructose but also glucose from the column interior can be accomplished in a short period of time by using a smaller volume of water. Both fructose and glucose can be recovered completely from the column without leaving any portion thereof behind. Once the column has been adapted for the contemplated treatment, it can be used repeatedly without being regenerated and desired continuous separation of fructose to be carried out on a commercial scale. Consequently, this treatment of separation produces fructose of extremely high purity.

The curves (D), (E) and (F) of FIG. 1 also indicate that at column temperatures exceeding 40° C., the point of time at which effluence of fructose started was delayed. This means that, at such column temperatures, the separation of fructose from contaminating substances such as oligosaccharides and inorganic salts can be effected more favorably. This effect is particularly conspicuous where the treatment is made by using an anion-exchange resin containing a sulfite group.

As to the upper limit to the temperature of treatment, anion-exchangers now available on the market are not sufficiently resistant to heat. The highest tolerable temperature is about 60° C. in the case of OH form anion-exchanger. As the temperature rises and exceeds 60° C., bisulfite (or sulfite) detaches itself from the bisulfite (or sulfite) form anion-exchange resin. To ensure stable column function for a long time, therefore, it is better for the column to be operated at temperatures not exceeding 60° C.

From the foregoing explanation, it is clear that the separation of fructose and glucose by the use of a bisulfite (or sulfite) form anion-exchange resin can be remarkably improved both technically and economically if the said anion-exchange resin is used at temperatures in the range of from about 40° C. to about 60° C. As previously described, the method of the present invention permits separation of fructose of high purity even from raw materials containing contaminating substances such as inorganic salts, organic salts, color materials, disaccharides, oligosaccharides, psicose and other similar monosaccharides in addition to glucose and fructose. Examples of inexpensive raw materials from which fructose of high purity can be separated by this method are: (1) Invert sugar which is obtained by hydrolyzing sucrose with a mineral acid or an organic acid such as oxalic acid and neutralizing the resultant hydrolyzate with an alkali, whereby the invert sugar contains salts; (2) invert sugar containing a small amount of sucrose or invert sugar containing color materials; (3) syrup containing oligosaccharides including disaccharide (ordinarily at a concentration of less than 10%) in addition to fructose and glucose, e.g. a fructose-containing glucose-isomerized syrup resulting from the glucose isomerization of hydrolyzates of starch; (4) acid hydrolyzates of molasses which contains coloring materials and inorganic salts (ashes) in large quantities; (5) syrup containing psicose, mannose organic salts in addition to fructose and glucose, e.g. a fructose-containing glucose-isomerized syrup resulting from the isomerization of glucose.

The contaminating substances present in these raw materials can be removed by using the bisulfite form anion-exchange resin bed maintained at temperatures in the range of 40° C.–60° C. The most effective separation of these contaminating substances can be accomplished by using the sulfite form anion-exchange resin bed and the bisulfite form anion-exchange resin bed in combination or by making the necessary treatment with a bed containing both bisulfite form and sulfite form anion-exchange resins.

To separate fructose from a sugar solution containing fructose and glucose by the method of this invention, the sugar solution to be introduced into the ion-exchange resin bed is desired to have a high concentration of 10 to 70%, preferably 30–60%.

After the introduction of the sugar solution into the ion-exchange resin bed, water is used for effecting the effluence of the supplied sugars from the column.

Although the volume of water to be poured into the column for this purpose is variable with the quantity of the sugar solution introduced, the capacity of the ion-exchange resin and the like, it is desired to approach the irreducible minimum required for thorough elution of the whole volume of sugar solution poured into the column.

As is evident from the foregoing explanation, the method of the present invention permits fructose alone to be separated with extreme ease from a mixture containing fructose, glucose and contaminating substances. The effects and salient features of this invention are enumerated below: (1) From a sugar solution containing glucose and fructose, this method can separate fructose of high purity (to say nothing of pure fructose) in a high yield. (2) The method proves to be commercially advantageous in that it can separate fructose and glucose effectively by using water alone. (3) Since the separation of glucose and fructose can be carried out using water, the sugar solutions obtained after separation require hardly any refining treatment. (4) Since the separation can be carried out using water, the column of anion-exchanger can be used repeatedly without requiring any regenerating treatment. (5) For a given volume of anion-exchanger column, this method permits a large amount of sugars, an incredibly large amount compared with the amount handled by the known chromatographic method of separation, to be treated at a time. (6) Since the sugars can be carried through the column with water, the sugar concentration in the effluent is high. Consequently this method can eliminate expenses which would otherwise be required for refining of sugar solutions, or for concentrating the effluent. (7) According to this method, glucose is recovered in the form of a mixture containing a major amount of glucose and a minor amount of fructose or in a solution solely of glucose. Although the mixture containing fructose and glucose may be fed into the column for further separation of fructose, the solution containing a major amount of glucose and a minor amount of fructose or the solution solely of glucose may be subjected to isomerization by using a glucose isomerase, alkali, an OH-form anion-exchange resin, or some other suitable catalyst so as to increase the fructose content by converting glucose into fructose. Then the mixture is fed to the column. By repeating this cycle of treatment, all the glucose present can eventually be separated as fructose. This method can be practiced more advantageously when it is employed in combination with a continuous treatment for the isomerization of glucose.

The present invention is described more specifically with reference to preferred embodiments cited hereinafter. These embodiments are cited by way of illustrating, and not by way of limiting, the present invention.

EXAMPLE 1

Ten (10) g. of sucrose was dissolved in 200 ml. of water, adjusted to pH 2 with hydrochloric acid, and hydrolyzed by heat at 100° C. for 30 minutes. After the hydrolysis, the solution was neutralized with sodium hydroxide and concentrated to about 70% under reduced pressure.

4 ml. of the invert sugar solution (1340 mg. each of fructose and glucose and 30.4 mg. of sodium chloride) was fed to a column packed (1.6 cm. in diameter x 33 cm. in length) with bisulfite form Dowex 1–X8 and maintained at about 40° C., with the effluence effected continuously by using water. The flow rate was 20 ml./hr. and the fraction volume was 3 ml. The fractions were assayed for fructose content, glucose content and sodium chloride content. The results are shown in Table 1.

TABLE 1

| Fraction number | Sodium chloride conc. (mg./ml.) | Fructose conc. (mg./ml.) | Glucose conc. (mg./ml.) |
| --- | --- | --- | --- |
| 10 | 0 | 0 | 0 |
| 11 | 0.09 | 0 | 0 |
| 12 | 0.35 | 0 | 0 |
| 13 | 0.30 | 0 | 0 |
| 14 | 0.05 | 13.4 | 0 |
| 15 | 0 | 51.5 | 0 |
| 16 | 0 | 86.8 | 0 |
| 17 | 0 | 113.2 | 0 |
| 18 | 0 | 102.0 | 0 |
| 19 | 0 | 60.0 | 8.2 |
| 20 | 0 | 13.6 | 36.3 |
| 21 | 0 | 6.5 | 52.8 |
| 22 | 0 | 0 | 58.2 |
| 23 | 0 | 0 | 58.0 |
| 24 | 0 | 0 | 53.0 |
| 25 | 0 | 0 | 44.1 |
| 26 | 0 | 0 | 35.3 |
| 27 | 0 | 0 | 27.2 |
| 28 | 0 | 0 | 20.0 |
| 29 | 0 | 0 | 14.4 |
| 30 | 0 | 0 | 7.0 |
| 31 | 0 | 0 | 3.5 |
| 32 | 0 | 0 | 0 |

The data of this table clearly indicate that the invert sugar containing sodium chloride could be satisfactorily separated into sodium chloride portion, fructose portion, and glucose portion by treating the invert sugar by a column of bisulfite form Dowex 1–X8.

EXAMPLE 2

This example describes a case in which the treatment was made by using a column packed with the mixture of a bisulfite form anion-exchanger and a sulfite form anion-exchanger. Removal of salts could be accomplished with still better results when the treatment was made by using a mixed-bed or multi-bed column of the two form of anion-exchanger than when there was used a column packed with a bisulfite form anion-exchanger alone.

25 ml. of the invert sugar solution (20.1 g. of invert sugar and 0.23 g. of sodium chloride) was fed to a mixed-bed column packed (2.5 cm. in diameter x 40 cm. in length) with bisulfite form and sulfite form Dowex 1–X8 and maintained at about 40° C., with the effluence from the column effected by using water. The flow rate was about 20 ml./hr. for each fraction and the fraction volume was 5 ml. The fractions weer assayed for fructose content, glucose content and sodium chloride content. The results are shown in Table 2.

TABLE 2

| Fraction number | Fructose conc. (mg./ml.) | Glucose conc. (mg./ml.) | NaCl conc. (mg./ml.) |
|---|---|---|---|
| 20 | 0 | 0 | 0 |
| 22 | 0 | 0 | 0 |
| 24 | 18.6 | 0 | 0 |
| 26 | 140.6 | 0 | 0 |
| 28 | 201.8 | 0 | 0 |
| 30 | 248.2 | 0 | 0 |
| 32 | 211.0 | 15.0 | 0 |
| 34 | 137.6 | 91.4 | 0 |
| 36 | 82.6 | 171.0 | 0 |
| 38 | 40.0 | 183.4 | 0 |
| 40 | 2.0 | 182.1 | 0 |
| 42 | 0 | 136.6 | 0 |
| 44 | 0 | 116.4 | 0 |
| 46 | 0 | 82.3 | 0 |
| 48 | 0 | 44.4 | 0 |
| 50 |  | 22.3 | 0 |
| 52 |  | 4.0 | 0 |
| 54 |  | 0 | 0 |

It is clear from this table that the sodium chloride-containing invert sugar could be separated into a fructose portion and a glucose portion each perfectly free from sodium chloride, and a portion containing the two sugars.

EXAMPLE 3

A double-walled column 5 cm. in inner column diameter and 100 cm. in length was packed (5 x 82 cm.) with bisulfite form Dowex 1–X8 having a particle size of 50 to 100 mesh. Hot water was circulated inside the outer column to maintain the column at a temperature of about 40° C. To the column was fed 106 g. of 75% invert sugar (79.5 g. of solids content) which was prepared according to the procedure of Example 1 and thereafter water was supplied. The flow rate was 214 ml./hr.

From the outlet of the column, water flowed out first, followed by fructose. Glucose was last to flow out. The three portions were collected separately. The completion of glucose flow was taken as the end of one cycle. At the end of one cycle, a fresh supply of sugar solution was introduced to the column and the procedure was repeated. Thus, the sugars were separated continuously. The results obtained are shown in FIG. 2.

Figure 2:
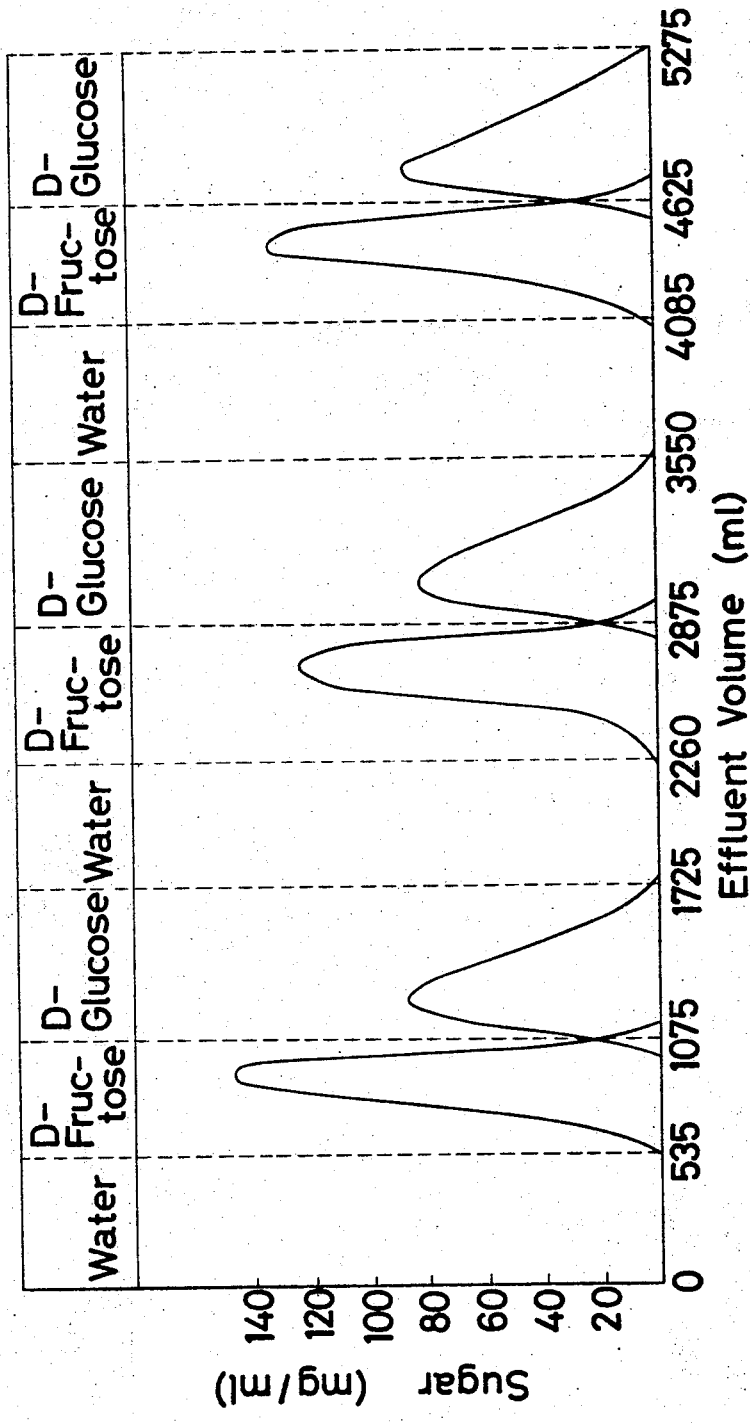
FIG. 2 is a graph showing the state of separation of fructose and glucose continuously separated from a mixture containing the said sugars.

It is clear from FIG. 2 that the total volume of effluent was about 1725 ml., which consisted of the first water portion of a volume of about 535 ml., the second fructose-rich solution of a volume of about 540 ml., and the last glucose-rich solution of a volume of about 650 ml. It is also clear that this cycle was repeated with regularity and it is possible the continuous separation of fructose.

EXAMPLE 4

To the same column as used in Example 3, there was fed 72 g. of invert sugar (43.2 g. of solids content) having a concentration of about 60% and thereafter water was supplied. The flow rate was about 210 ml./hr. and the raction volume was 25 ml.

After completion of the separation, the fructose portions and the glucose portions were collected respectively and assayed. The results show that there was separated 21.0 g. of fructose having purity of 99.9%.

Subsequently, the glucose portion was concentrated to about 50%. The concentrate was combined with MgSO$_4$ of an amount to give a concentration of 0.005 mole, CoCl$_2$ of an amount to give a concentration of 0.001 mole, and 900 units of glucose isomerase. The mixture was heated at 70° C. for 24 hours to cause reaction. Consequently, there was obtained a sugar solution containing 11.0 g. of fructose and 10.5 g. of glucose. This isomerized sugar solution was treated with a column of bisulfite form Dowex 1–X8 by following the procedure mentioned above. Consequently, it was separated into 10.8 g. of fructose and 10.4 g. of glucose.

EXAMPLE 5

This example describes a case in which fructose was separated from the fructose-containing glucose-isomerized syrup derived from starch as the raw material.

Glucose isomerase was added to react upon the hydrolyzate of starch of DE 97.5 which had been obtained by dextrinizing starch with α-amylase and saccharifying the liquefied starch with glucoamylase. The isomerization reaction was carried out at 70° C., pH 6.5–7.0. The obtained fructose-containing glucose-isomerized syrup (containing 35.4% of fructose, 36.9% of glucose, and about 5% of oligosaccharides) consequently obtained was decolored and refined with active carbon and anion-exchange resin and then used as the raw material for separation of fructose.

To a column packed (1.5 x 60 cm.) with sulfite form Dowex 1–X8 and kept at about 40° C., there was fed 5 ml. of the aforesaid isomerized syrup. The effluence from the column was effected by using water. The flow rate was about 10 ml./hr. and the fraction volume was 3 ml.

Figure 3:
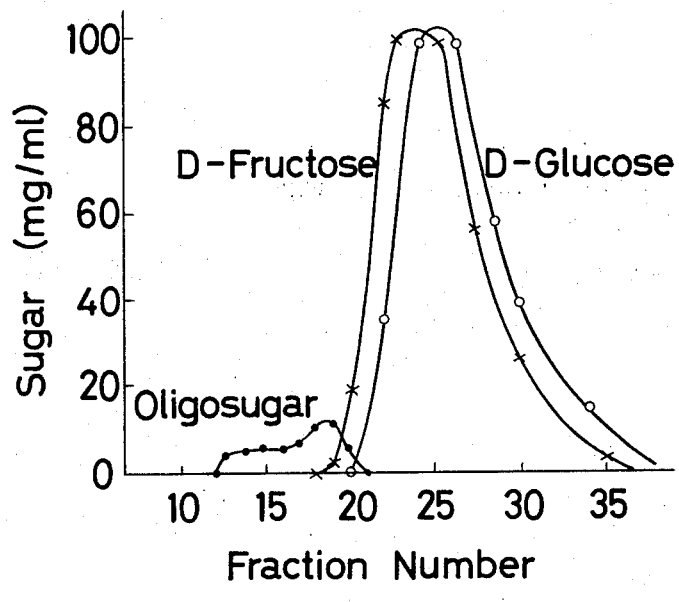
FIG. 3 is a graph showing the state of separation of oligosaccharides, fructose and glucose from a fructose-containing glucose-isomerized syrup obtained from starch as the raw material.

The fractions were assayed for fructose, glucose, and oligosaccharides. The results are shown in FIG. 3.

The oligosaccharides content was expressed by the amount of the reducing sugar (expressed in terms of glucose) which was obtained by decomposing the oligosaccharides with 2.5% hydrochloric acid for one hour at 100° C.

As is clearly shown in the graph, the effluence from the column occurred first on the oligosaccharides (fraction Nos. 12 to 20) and then on fructose and glucose.

By collecting the fractions, Nos. 21 through 39, there could be obtained sugar solution containing glucose (2.39 g.) and fructose (2.30 g.) and no oligosaccharides.

Then, this mixed sugar solution containing glucose and fructose was concentrated. The concentrated solution was fed to a column packed (2 cm. x 30 cm.) with bisulfite form Dowex 1–X8 maintained at about 40° C. and then water was supplied. Consequently, there were contained 2.23 g. of pure fructose and a mixed sugar solution containing 2.29 g. of glucose and 0.06 g. of fructose.

By the procedure mentioned above, the oligosaccharides could be removed, and fructose and glucose could be separated from the fructose-containing glucose-isomerized syrup which was derived from starch by the actions with α-amylase, gluco-amylase and glucose isomerase. In another procedure, the fructose-containing glucose-isomerized syrup was first treated with a bisulfite form anion-exchanger to be separated into glucose and a mixture of fructose and oligosaccharides. Thereafter, the fructose containing the oligosaccharides was treated with a column packed with a sulfite form anion-exchanger to effect the separation of fructose and oligosaccharides. In still another procedure, the same syrup was treated with a column packed with a mixture of a bisulfite form anion-exchanger to accomplish the separation of fructose, glucose and oligosaccharides respectively.

EXAMPLE 6

To a column (2.5 cm. in diameter and 40 cm. in length) packed with bisulfite form Dowex 1–X8 and maintained at about 40° C., 10 ml. of the same isomerized syrup as used in Example 5 was fed and water was supplied subsequently. The fructose portions were collected and concentrated to afford 6 ml. of sugar solution (fructose 36.1%, oligosaccharide 4.2%). This solution was fed to a column packed (1.5 cm. in diameter and 78 cm. in length) with sulfite form Dowex 1–X8 which was maintained at about 40° C., and water was supplied subsequently. There could be separated about 2.2 g. of practically pure fructose free from the oligosaccharides.

EXAMPLE 7

This example describes a case in which sugars containing extraneous substances such as coloring matter and inorganic salts which are obtained from an acid hydrolyzate of molasses are separated by the use of sulfite form Dowex.

Molasses was adjusted to pH 2 with hydrochloric acid, hydrolyzed at 100° C. for 30 minutes, subsequently neutralized to about pH 6 with sodium hydroxide, and filtered. The filtrate was concentrated under reduced pressure to about 50% of sugar content. The concentrate was found to have a fructose content 27.8%, a glucose content 22.5%, and an ash content 9.75% and give 165 as the color value (absorption coefficient at 420 mμ).

Figure 4:
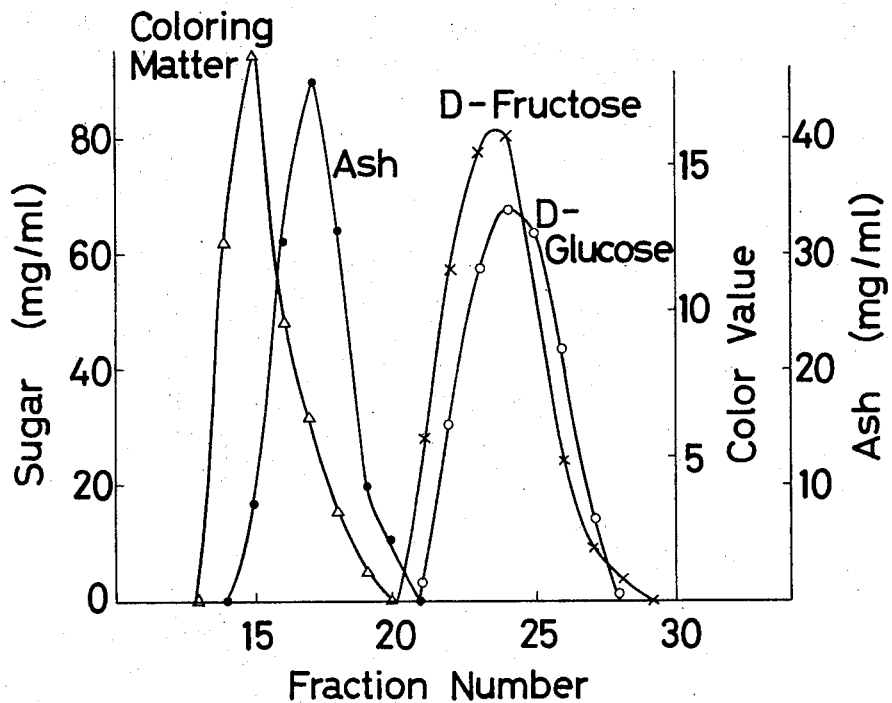
FIGS. 4 and 5 are graphs showing the state of separation of coloring matter and inorganic salts separated from molasses.

Four (4) ml. of this concentrated sugar solution was fed to a column packed (1.5 cm. in diameter x 60 cm. in length) with sulfite form Dowex 1–X8 which was maintained at about 40° C. Then, water was supplied. The flow rate was about 9 ml./hr. and the fraction volume was 3 ml. The results are shown in FIG. 4.

EXAMPLE 8

Figure 5:
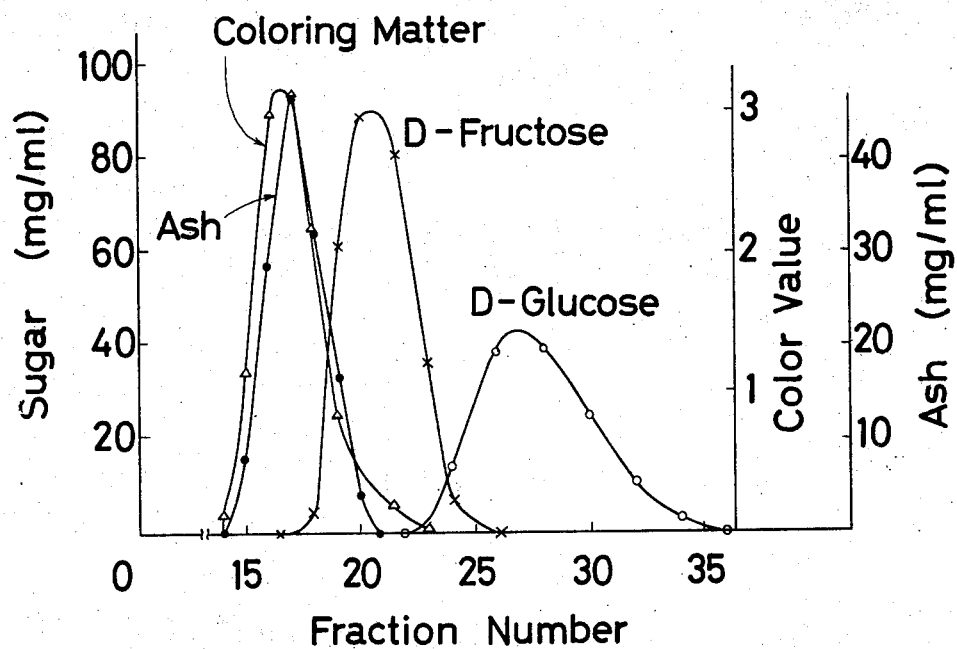

A 4-ml. portion of the acid hdyrolyzates of molasses prepared in Example 6 was fed to a column packed (1.9 cm. in diameter x 59 cm. in length) with bisulfite form Dowex 1–X8 which was maintained at about 40° C., and water was supplied subsequently. The flow rate was about 9 ml./hr. and the fraction volume was 3 ml. The fractions were assayed for fructose content, glucose content, ash content and value of chromaticity. The results are shown in FIG. 5.

The graph indicates that the acid hydrolyzate of molasses could be satisfactorily separated into coloring matter, inorganic salt portion, fructose portion, and glucose portion.

EXAMPLE 9

This example describes a case in which fructose and glucose were separated from acid hydrolyzate of molasses by treating the hydrolyzate with a device having a column of sulfite form anion-exchanger and a column of bisulfite form anion-exchanger combined in a series connection.

Acid hydrolyzates of molasses (fructose content 19.5%, glucose content 17.8%, ash content 9%, and color value 158) was prepared by following the procedure of Example 6. To a column packed (1.5 cm. in diameter x 60 cm. in length) with sulfite form Dowex 1–X8 and maintained at about 40° C., there was fed 10 ml. of the hydrolyzate, with the elution effected by using water. From the outlet of the column of sulfite form anion-exchanger, coloring matter and inorganic salts were first discharged. When the effluence of coloring matter substantially terminated, this column was connected to another column of a bisulfite form anion-exchanger for further treatment of the effluent from the former column. As the column of bisulfite form anion-exchanger, there was used a column packed (1.9 cm. in diameter x 23 cm. in length) with bisulfite form Dowex 1–X8, with the column maintained at about 40° C.

The effluent from the column of bisulfite form anion-exchanger was collected as 3-ml. fraction, which were assayed for fructose content, glucose content, ash content and color value. The results are shown in Table 3.

The data of the table clearly indicate that fructose and glucose could be satisfactorily separated from the acid hydrolyzate of molasses by treating the hydrolyzate with the device which combined the column of sulfite form anion-exchanger and the column of bisulfite form anion-exchanger.

TABLE 3

| Fraction number | Fructose content (mg./ml.) | Glucose content (mg./ml.) | Color value | Ash content |
|---|---|---|---|---|
| 14 | 0 | 0 | 0 | 0 |
| 15 | 9.4 | 0 | 0 | 0 |
| 16 | 27.9 | 0 | 0 | 0 |
| 17 | 51.2 | 0 | 0 | 0 |
| 18 | 67.9 | 0 | 0 | 0 |
| 19 | 72.6 | 0 | 0 | 0 |
| 20 | 68.8 | 0 | 0 | 0 |
| 21 | 57.6 | 0 | 0 | 0 |
| 22 | 47.1 | 7.9 | 0 | 0 |
| 23 | 36.7 | 18.0 | 0 | 0 |
| 24 | 25.1 | 28.4 | 0 | 0 |
| 25 | 23.7 | 33.0 | 0 | 0 |
| 26 | 13.4 | 33.4 | 0 | 0 |
| 27 | 8.4 | 34.5 | 0 | 0 |
| 28 | 4.7 | 32.9 | 0 | 0 |
| 29 | 3.0 | 32.3 | 0 | 0 |
| 30 | 1.9 | 30.9 | 0 | 0 |
| 31 | 0 | 27.5 | 0 | 0 |
| 32 | 0 | 22.8 | 0 | 0 |
| 33 | 0 | 19.0 | 0 | 0 |
| 34 | 0 | 13.9 | 0 | 0 |
| 35 | 0 | 11.5 | 0 | 0 |
| 36 | 0 | 7.9 | 0 | 0 |
| 37 | 0 | 6.0 | 0 | 0 |
| 38 | 0 | 3.8 | 0 | 0 |

EXAMPLE 10

This example describes a case in which boric acid was removed and, at the same time, fructose and glucose were separated from the reaction solution obtained by isomerizing glucose to fructose in the presence of boric acid or a borate by glucose isomerase.

To a column packed (1.6 cm. in diameter x 30 cm. in length) with bisulfite form Dowex 1–X8 and maintained at about 40° C., 4 ml. of a sugar solution containing 1.86 g. of fructose, 0.30 g. of glucose and 0.12 g. of boric acid was fed, and thereafter water was supplied. The flow rate was about 5 ml./hr. and the fraction volume was 3 ml. The fractions were assayed for glucose content, fructose content, and boric acid content. The results are shown in Table 4.

From the data of this table, it is clear that glucose, fructose and boric acid could be separated satisfactorily from the boric acid-containing mixed solution of glucose and fructose.

TABLE 4

| Fraction number | Fructose content (mg./ml.) | Glucose content (mg./ml.) | Boric acid content (mg./ml.) |
|---|---|---|---|
| 11 | 0 | 0 | 0 |
| 12 | 4.4 | 0 | 0 |
| 13 | 9.7 | 0 | 0 |
| 14 | 57.6 | 0 | 0 |
| 15 | 115.2 | 0 | 0 |
| 16 | 166.0 | 0 | 0 |
| 17 | 156.8 | 0 | 0 |
| 18 | 122.8 | 0 | 0 |
| 19 | 84.4 | 0.6 | 0 |
| 20 | 49.2 | 2.1 | 0 |
| 21 | 14.0 | 3.9 | 0 |
| 22 | 3.0 | 4.8 | 0 |
| 23 | 0 | 4.3 | 0 |
| 24 | 0 | 2.5 | 0 |
| 25 | 0 | 0.9 | 0.89 |
| 26 | 0 | 0.4 | 2.00 |
| 27 | 0 | 0 | 3.38 |
| 28 | 0 | 0 | 7.81 |
| 29 | 0 | 0 | 5.01 |
| 30 | 0 | 0 | 0.89 |
| 31 | 0 | 0 | 0 |

What is claimed is:

1. A method for separating and recovering fructose and glucose from a mixture consisting of fructose, glucose and contaminating substances comprising the steps of (1) supplying said mixture to a bed of an anion-exchange resin of the form of at least one selected from the group consisting of the bisulfite form and the sulfite form and (2) eluting the bed with water to effect the separation and recovery of fructose and glucose, said bed being maintained at a temperature between 40–60° C.

2. The method according to claim 1, wherein said mixture is a solution containing inorganic salt as a contaminating substance obtained by hydrolyzing sucrose with a mineral acid and then neutralizing with alkali.

3. The method according to claim 1, wherein said mixture is sequentially supplied first to a sulfite form anion-exchanger to remove contaminating substances therefrom and then to a bisulfite form anion-exchanger to separate fructose from glucose.

4. The method according to claim 1, wherein said mixture is supplied first to a bisulfite form anion-exchanger to separate said mixture into glucose and a mixture of fructose and contaminating substances, and further supplying said mixture of fructose and contaminating substances to a sulfite form anion-exchanger to remove contaminating substances from the fructose.

5. The method according to claim 1, wherein at least some of said anion-exchange resin is in the sulfite form.

6. The method according to claim 1, wherein said mixture is a solution obtained by acid-hydrolysis of sucrose.

7. The method according to claim 6, wherein said solution contains sucrose as a contaminating substance.

8. The method according to claim 1, wherein said mixture is a fructose-containing glucose isomerized syrup.

9. The method according to claim 8, wherein said fructose-containing glucose isomerized syrup contains oligosaccharides including disaccharides and a contaminating substance.

10. The method according to claim 8, wherein said fructose-containing glucose isomerized syrup contains maltose as a contaminating substance.

11. The method according to claim 8, wherein said fructose-containing glucose isomerized syrup contains mannose as a contaminating substance.

12. The method according to claim 8, wherein said fructose-containing glucose isomerized syrup contains psicose as a contaminating substance.

13. The method according to claim 8, wherein said fructose-containing glucose-isomerized syrup contains borates as a contaminating substance.

14. The method according to claim 8, wherein said fructose-containing glucose isomerized syrup contains inorganic salts as a contaminating substance.

15. The method according to claim 8, wherein said fructose-containing glucose isomerized syrup contains color materials as a contaminating substance.

References Cited

B. Lindberg et al.; Carbohydrate Research, 5, 286–91 (1967).

MORRIS O. WOLK, Primary Examiner

S. MARANTZ, Assistant Examiner

U.S. Cl. X.R.

127—41; 260—2.1 R, 2.1 M